March 12, 1935.   H. P. MULFORD   1,994,400
PLANT PACKAGE
Filed Dec. 1, 1931   2 Sheets-Sheet 2
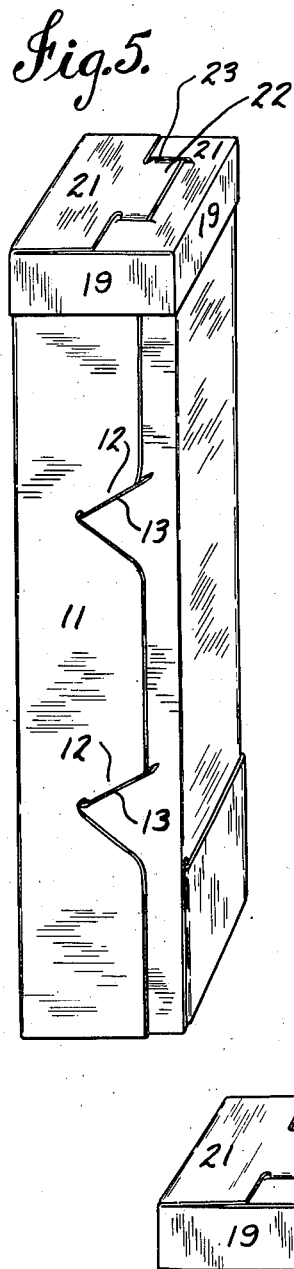
Fig. 5.
Fig. 7.
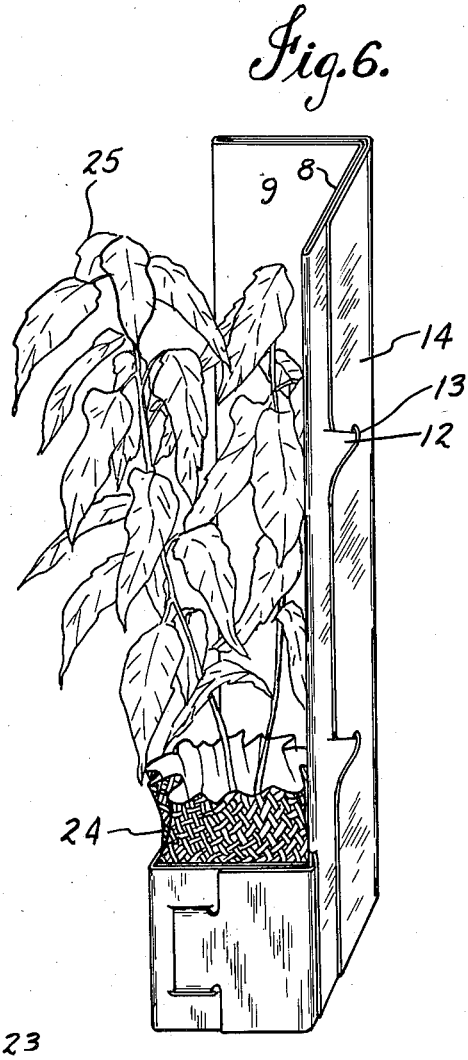
Fig. 6.
INVENTOR.
ATTORNEYS.

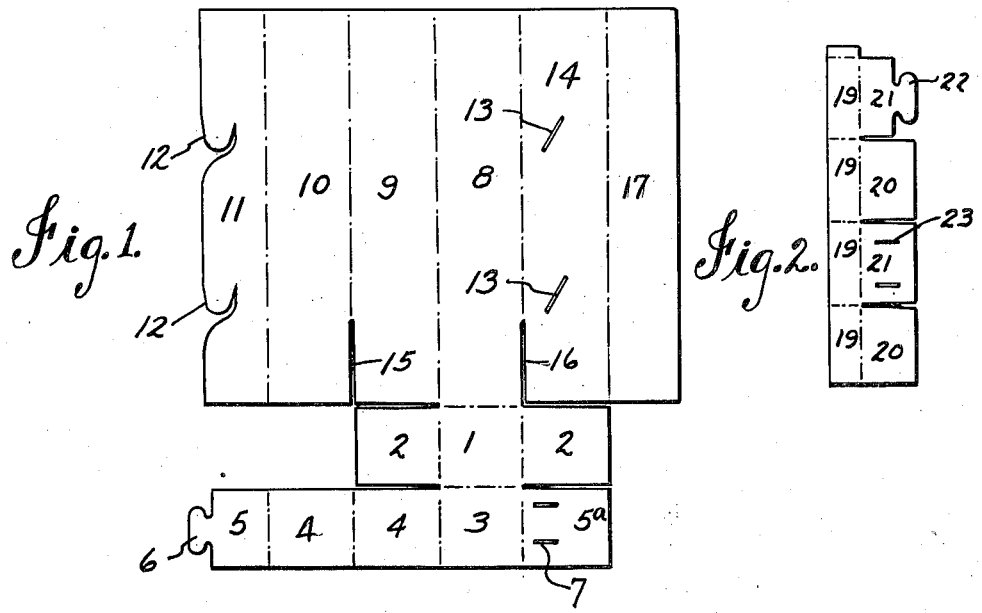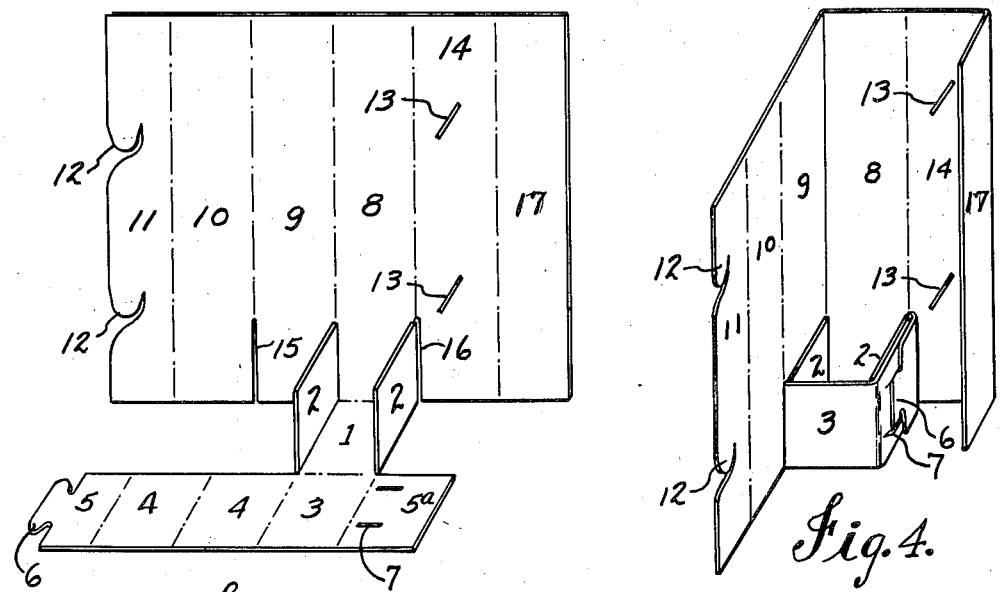

Patented Mar. 12, 1935

1,994,400

UNITED STATES PATENT OFFICE 1,994,400

PLANT PACKAGE

Hewett P. Mulford, Lebanon, Ohio

Application December 1, 1931, Serial No. 578,260

12 Claims. (Cl. 206—46)

My invention relates to plant packages, and particularly to a novel plant package having cover portions which are unfoldable to expose the flowers or foliage of the plant for display.

In the packaging of plants having flower buds, flowers and foliage, in the past it has been customary to enclose the roots in a pot filled with dirt and to wrap the foliage or flowers or buds with paper. Sometimes a stick has been inserted in the dirt of the pot to support the leaves and foliage. In any event the plants have been fragile, so that the delivery, for example, from department stores has resulted in such frequent damage to the plants that such stores have had to insist that customers carry them with them.

In displaying the flowers or foliage, it has been necessary to untie and unwrap the paper and this required re-wrapping and re-tying, which also resulted in frequent damage to the plants.

Altogether, the flimsiness of the wrappings of potted plants has offered a serious handicap to profitable commercial marketing.

It is an object of my invention to provide a plant package which will be of substantial sturdiness so that the likelihood of damage in delivery will be materially lessened.

Another object is the provision of a package or carton which will have a container with reinforced two-ply walls enclosing the pot, and with single-ply walls enclosing the foliage or flowers, which single-ply walls may be folded back to display the plant. It is my object to so arrange interlocking tabs on the portions of the carton enclosing the foliage or flowers that the walls of the carton can be arranged either to completely enclose and protect the exposed growing portion of the plant, or to fold back so that the plant may be attractively displayed.

Another object of my invention is to provide a package for growing plants which can be made from a single cut and scored blank.

The above and other objects to which reference will be made in the ensuing disclosure, I accomplish by that certain combination and arrangement of parts of which I have shown a preferred embodiment.

Referring to the drawings:—

Figure 1 is a plan view of my preferred type of carton blank.

Fig. 2 is a plan view of a blank which may be folded to form a cover for the carton.

Fig. 3 is a perspective view of the blank illustrating the first folding operation.

Fig. 4 is a perspective view of the blank illustrating the second folding operation.

Fig. 5 is a perspective view of my preferred type of carton completely closed.

Fig. 6 is a perspective view of the carton opened out in display position.

Fig. 7 is a perspective view of the detachable top formed from the blank shown in Fig. 2.

In Fig. 1 I have shown a cardboard container having a bottom wall 1, with side walls 2 articulated thereto. A front wall 3 is also articulated to the bottom wall 1. The wall 3 has articulated thereto to one side succeeding portions 4 of similar size and shape as the side wall members 2. Attached to the outer one of the walls 4 is a flap 5 which has an interlocking tongue 6, and to the other side of wall 3 is attached a flap 5a provided with slots 7 for receiving the tongue 6.

Articulated to the remaining edge of the wall 1 is an upright member 8, to which is joined along one side a cover member 9. Connected to the other wall of the member 9 is a member 10. The member 10 has a flap 11 hinged to it which is provided with tongues 12, which interlock in slots 13 in a folding flap 14 connected to the opposite edge of member 8. A slit 15 separates the bottom portions of members 9 and 10, and a slit 16 separates the bottom portions of members 8 and 14. The various stages of the box assembly are illustrated in Figs. 3 and 4. First the sides 2 and member 8 are folded up at a right angle to the bottom wall 1; then the wall 9 is folded at a right angle to the wall 8, so that a lower portion 15 of the wall 9 lies against the outer surface of one of the side walls 2. The wall 3 is then folded up to the edge of walls 2, and flap 5a is then folded in against the outer surface of the other side wall 2.

Then the flaps 4 and flap 5 are folded around the outer surfaces of the members 9 and 8, passing through slits 15 and 16, respectively. The flap 5 thus becomes folded against the outer surface of the flap 5a, and its tongues 6 are caused to interlock within the slots 7.

The next operation in assembling the container is to fold the wall 14 across the flaps 5a and 5 so that its edge flap 17 will lie against the outer surface of the wall 3. A substantially cubical compartment is thus formed for receiving the pot in which the roots of the plant are growing, which container has two-ply walls enclosing two of its sides, and three-ply walls enclosing the other sides. Thus on the sides formed initially by folding up the flaps 2, there are three thicknesses of board and on the opposed walls there are two thicknesses. This makes a sturdy container within which the pot may be placed without likelihood of damage.

After the pot is placed in the compartment having the bottom wall 1, the walls 10 and 11 are folded around so as to make a rectangular enclosure for the flowers or foliage of the plant. The tongues 12 may then be inserted in the slots 13 so as to lock the walls enclosing the plant foliage within the compartment.

As one way of forming a closure for the top of the container, I may provide a lid having articulated sides 19, to opposite pairs of which top closing flaps 20 are articulated. A lock for the cover member is formed by flaps 21, one of which has a tongue 22, and the other has slots 23 for receiving the tongues.

While I have shown one type of top cover, it should be understood that the cover may be formed in one piece from the blank forming the container.

Fig. 5 shows the complete package, ready for delivery. By interlocking the locking tabs 12 over the slots 13, which can be accomplished by a pressing movement upwardly, the wall 10 may be folded back against the outer surface of the wall 9, and the wall 14 may be folded back against the outer surface of the wall 8 with its flap 17 around between walls 10 and 9 and wall 11 outside of wall 14. The tongues 12 of the wall 11 may then be inserted in the slots 13 of the wall 14, and the foliage or blossoms of the plant will be attractively displayed against the background formed by the inner surfaces of the walls 8 and 9.

In the illustration in Fig. 6 a wrapper 24 is shown as enclosing the pot and the foliage of the plant is indicated at 25. The lower portion enclosing the pot may or may not be decorated as a jardinière and the pot may be enclosed in auxiliary waterproof container. The packages may be stacked in a truck thereby enabling more packages to be placed in the truck than with the former method of tiering the flimsy wrapped pots.

It will be readily understood that the general shape of the package may be varied and the manner of arranging the tongues changed; but since no one previously has suggested the use of a container having a reinforced portion for housing the pot of a plant and folding walls which will fold back so that the plant may be attractively displayed, I claim the same broadly herein.

Having thus described my invention, what I claim as new and desire to secure by Letters Patent, is:—

1. A plant package comprising a container and a potted plant having the pot housed within said container and its foliage extended from the container, said container having extensions meeting there-around forming an enclosure for the foliage, said extensions being reversely foldable to meet around the container for exposing the plant foliage for display.

2. A plant package comprising a container and a potted plant having the pot housed within said container and its foliage extended from the container, said container having extensions each folding around a plurality of its sides for forming an enclosure for the foliage, said extensions being reversely foldable around sides of the container for exposing the plant foliage for display, said container having multiply side walls comprising the extensions folded in either direction.

3. A container for a potted plant having portions foldable to form a compartment for housing the plant pot with the plant foliage extended therefrom and extensions on said first noted portions foldable around a plurality of sides of said compartment to form a compartment for housing the plant foliage, said last noted portions reversely foldable around a plurality of sides of the compartment to reveal the foliage of the plant.

4. A display carton for a potted plant having pot enclosing portions for locking around the lateral sides of the pot and independently foldable foliage enclosing portions locking around said pot enclosing portion.

5. A carton for enclosing a potted plant provided with foliage enclosing members movable to such position as will expose the foliage of the plant, said members comprising articulated walls provided with locking means for retaining certain of said walls in either enclosing or display position, said carton having a reinforced portion self-sustaining for enclosing the pot when the foliage enclosing members are in either position.

6. A container for a potted plant having a multi-sided compartment for the pot, upward extensions fixed to two adjacent sides of the compartment with connected vertical edges, and members hinged to the other edges of the respective extensions to meet around the plant foliage or to fold in back of said upward extensions for display of the foliage at a plurality of sides thereof.

7. A container for a potted plant having a multi-sided compartment for the pot, comprising opposite inner upstanding plies and outer upstanding plies wrapping laterally around the inner plies, and a series of foliage compartment walls extending up from said compartment and wrapping laterally around the pot compartment.

8. A container for a potted plant comprising a rectangular bottom with inner walls folded up from two opposite edges, a first series of walls folded up from a third edge and wrapping around said inner walls, forming a container for the pot, and a second series of higher walls folded up from the fourth edge of said bottom and wrapping around the walls of said pot container and forming an enclosure for the plant foliage by their extensions above said pot container.

9. A container for a potted plant comprising a rectangular bottom with inner walls folded up from two opposite edges, a first series of walls folded up from a third edge and wrapping around said inner walls, forming a container for the pot, and a second series of higher walls folded up from the fourth edge of said bottom and wrapping around the walls of said pot container and forming an enclosure for the plant foliage by their extensions above said pot container, said second series of walls having slits through which the first series of wrapped-around walls extend to bind one of two walls of said second series to said inner walls.

10. A container for a potted plant having a multi-sided compartment for the pot, comprising opposite inner upstanding plies and outer upstanding plies wrapping laterally around the inner plies, and means on the respective ends of said outer plies interlocking and holding said outer plies around the inner plies, a series of foliage compartment walls extending up from said compartment and wrapping laterally around the pot compartment, and means on the respective ends of said series of foliage compartment walls interlocking and holding said series of walls around the pot compartment.

11. A container for a potted plant comprising a rectangular bottom with inner walls folded up from two opposite edges, a first series of walls folded up from a third edge and wrapping around said inner walls, forming a container for the pot, and a second series of higher walls folded up from the fourth edge of said bottom and wrapping around the walls of said pot container and forming an enclosure for the plant foliage by their extensions above said pot container, each series of walls having means on its respective ends to hold the series of walls in wrapped-around condition.

12. A container for a potted plant comprising a rectangular bottom with inner walls folded up from two opposite edges, a first series of walls folded up from a third edge and wrapping around said inner walls, forming a container for the pot, and a second series of higher walls folded up from the fourth edge of said bottom and wrapping around the walls of said pot container and forming an enclosure for the plant foliage by their extensions above said pot container, said second series of walls having slits through which the first series of wrapped-around walls extend to bind one of two walls of said second series to said inner walls, each series of walls having means on its respective ends to hold the series of walls in wrapped-round condition.

HEWETT P. MULFORD.